United States Patent
Rahman et al.

(10) Patent No.: US 11,124,455 B2
(45) Date of Patent: Sep. 21, 2021

(54) NANOZEOLITE-MODIFIED GREEN CONCRETE

(71) Applicant: King Fahd University of Petroleum and Minerals, Dhahran (SA)

(72) Inventors: Muhammad Kalimur Rahman, Dhahran (SA); Mohammed Ibrahim, Dhahran (SA); Luai M. Alhems, Dhahran (SA); Mohammed Salihu Barry, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 52 days.

(21) Appl. No.: 16/671,871

(22) Filed: Nov. 1, 2019

(65) Prior Publication Data

US 2021/0130236 A1    May 6, 2021

(51) Int. Cl.

| | | |
|---|---|---|
| *C04B 28/26* | (2006.01) | |
| *C04B 40/00* | (2006.01) | |
| *C04B 22/06* | (2006.01) | |
| *C04B 14/04* | (2006.01) | |
| *C04B 14/28* | (2006.01) | |
| *C04B 14/06* | (2006.01) | |
| *C04B 14/14* | (2006.01) | |
| *C04B 103/10* | (2006.01) | |

(52) U.S. Cl.
CPC ............ *C04B 28/26* (2013.01); *C04B 14/047* (2013.01); *C04B 14/06* (2013.01); *C04B 14/14* (2013.01); *C04B 14/28* (2013.01); *C04B 22/062* (2013.01); *C04B 40/0042* (2013.01); *C04B 2103/10* (2013.01); *C04B 2201/52* (2013.01)

(58) Field of Classification Search
CPC ....... C04B 14/047; C04B 14/06; C04B 14/14; C04B 14/28; C04B 22/062; C04B 28/26; C04B 40/0042; C04B 2103/10; C04B 2201/52

See application file for complete search history.

(56) References Cited

U.S. PATENT DOCUMENTS

| | | |
|---|---|---|
| 9,034,101 B2 | 5/2015 | Ronin |
| 9,802,865 B1 | 10/2017 | Chau et al. |
| 9,919,974 B2 | 3/2018 | Gong et al. |
| 10,150,904 B1 | 12/2018 | Rahman et al. |
| 2017/0057872 A1 | 3/2017 | Easton et al. |

OTHER PUBLICATIONS

Najimi, et al.; Engineering properties of natural pozzolan/slag based alkali-activated concrete; Construction and Building Materials, vol. 208; pp. 46-62; May 30, 2019; Abstract Only; 2 Pages.
Shakeel, et al.; Performance of Synthetic Nano-Zeolite as an Additive for Oil-Well Cement; 13$^{th}$ Middle East Geosciences Conference and Exhibition; Mar. 5-8, 2018; Abstract Only; 1 Page.
Rahman, et al.; Effect of Incorporating Nano Zeolite on the Strength of Natural Pozzolan-Based Geopolymer Concrete; Interdependence between Structural Engineering and Construction Management; 2019; 6 Pages.

*Primary Examiner* — Anthony J Green
(74) *Attorney, Agent, or Firm* — Oblon, McClelland, Maier & Neustadt, L.L.P.

(57) ABSTRACT

A nanozeolite modified green concrete contains alkali-activated natural pozzolan. Natural pozzolan is a green and sustainable material, potentially useful in green concrete, e.g., to curb greenhouse gas emissions associated with ordinary Portland cement production. Nanozeolite (NZ) is present as an additive to the green concrete, e.g., at 3 to 5 wt. %, of natural pozzolan to improve strength development and microstructural properties, resulting in superior strength and denser microstructure compared to a green concrete without nanozeolite.

20 Claims, 5 Drawing Sheets

NANOZEOLITE-MODIFIED GREEN CONCRETE

STATEMENT OF ACKNOWLEDGEMENT

The inventors gratefully acknowledge the Center for Engineering Research (CER) of the Research Institute, King Fand University of Petroleum and Minerals, Dhahran, Saudi Arabia for funding the research described herein.

STATEMENT REGARDING PRIOR DISCLOSURES BY INVENTOR(S)

Aspects of the present disclosure were described in a presentation at the International Structural Engineering and Construction (ISEC-10) conference, held May 20 to 25, 2019, in Chicago, USA; Muhammad Kalimur Rahman, Mohammed Ibrahim, Mohammed Salihu Barry, and Hassan Al Khalifa (2019), "Effect of Incorporating Nano Zeolite on the Strength of Natural Pozzolan-Based Geopolymer Concrete". Interdependence between Structural Engineering and Construction Management; Ozevin, D., Ataei, H., Modares, M., Gurgun, A., Yazdani, S., and Singh, A. (eds.), ISEC Press—ND, USA, Vol. 6(1), May 2019. Pp. MAT-48-1 to MAT-48-6.

BACKGROUND OF THE INVENTION

Field of the Invention

The present disclosure relates to alkali activated natural pozzolan concrete compositions, particularly those using zeolite additives, particularly nanozeolites, to provide building materials optionally suitable as structural materials, e.g., when used with aggregates, and/or effective for reducing the energy burden of typical cement production. Methods of making and using such compositions are also provided.

Description of the Related Art

The use of nanomaterials in building materials is a growing area of research due to the ability of nanomaterials to enhance the engineering properties and/or mechanical properties, e.g., of binders and/or other components. The hardening properties of certain building materials can be improved by compact additive microstructures of high reactivity, which may form composite structures. A particle packing effect can also result from particular nanosized and/or nanostructured additives.

Alkali-activated binders (AAB) have recently become the subject of research interest due to their potential beneficial properties, as well as their potential to serve as an alternative to ordinary Portland cement. Some of the potential benefits of alkali-activated binders may include lower environmental impact, high early strength, and better durability performance. However, the strength development of alkali-activated binders depends on the chemical composition of precursor materials as well as curing conditions.

Thus far, industrial byproducts, such as fly ash, have been extensively used as source material in synthesizing alkali-activated binders, with curing temperatures between 40 to 80° C. Strength development is rapid when these binders are cured at elevated temperature because the heat accelerates the reactivity of alkali-activated binders. To improve the reaction kinetics of alkali-activated binders, finer materials can be added to the primary precursor materials to improve the reactivity. The fineness of the precursor material can have a profound effect on the rate of reactivity.

Many fine materials dissolve easily in alkaline solution, potentially leading to higher conversions of the source materials to polymeric compounds, thereby enhancing the strength of alkali-activated binders. The dissolution of source materials having particle sizes of more than 20 μm is typically rather slow, whereas materials with particle size of less than 2 μm can dissolve more rapidly. Nanomaterials which may have high specific surface areas may have the be potential to improve the strength development of alkali-activated and similar binders. Earlier studies have used nanosilica and nanoalumina to improve the properties of alkali-activated binders.

Mater. Des. 2014, 55, 58-65 by Phoo-Ngernkham et al. (Phoo-Ngernkham) discloses the influence of incorporating nanosilica (NS) and nanoalumina (NA) on the strength and microstructure of a high calcium, fly ash-based alkali-activated binder, cured under ambient conditions at a particular alkaline activator concentration and ratio. Phoo-Ngernkham reports that 2% nano material was sufficient to obtain enhanced strength, forming calcium silicate hydrate (C—S—H) or calcium alumina silicate hydrate (C-A-S—H) gel along with sodium alumina silicate hydrate (N-A-S—H) gel.

Constr. Building Mater. 2014, 70, 453-459 by Adak et al. (Adak) discloses replacing fly ash with up to 10% nanosilica (NS) in developing alkali activated mortar even though the source material was rich in silica and alumina. Adak reports cure mortars showing an increase in strength of 15% due to 6% replacement of fly ash with nanosilica (NS).

US 2017/0057872 A1 by Easton et al. (Easton) discloses masonry product feedstock compositions having natural aluminosilicate minerals, e.g., clay minerals and feldspars, that show an activated geopolymer reaction. Eaton uses an alkali activator to create structural bonds within a mix of aggregates in the feedstock having a low moisture content, e.g., 5 to 10 wt. %. Eaton's products can include structural masonry units, veneer facing blocks, pavers, and other pre-cast products. Eaton's constituents can include nano-additives, such as any of amorphous silica and boehmite, zeolitic precursors, and precipitates such as calcium silica hydrate (C—S—H) and calcium aluminum silica hydrate (C-A-S—H). Eaton's describes using 15 to 35 wt. % natural aluminosilicate minerals, 50 to 75 wt. % regional aggregates, 3 to 5 wt. % sodium silicate and sodium hydroxide alkali activators, and 5 to 10 wt. % water. Eaton cautions against use pozzolanic materials, as well as fly ash, metallugical slags, calcinced clays, or silica fume, as its aluminosilicate precursor, preferring clay minerals and feldspar to provide a low strength concrete with strength ranging from 2 to 13.1 MPa, i.e., generally for non-structural applications.

U.S. Pat. No. 10,150,904 to Rahman et al. (Rahman) discloses methods for making a cement composition comprising a nanoparticle zeolite for enhanced compressive and tensile strengths, improved rheology, changed cement microstructure, and improved utility in drilling operations and under high pressure and high temperature conditions. Rahman mixes water and/or brine with 40 to 50 wt. % hydraulic cement and 0.5 to 4 wt. % zeolite nanoparticles of an average diameter of 40 to 100 nm, yielding cured cement with zeolite dusters having an average cluster diameter of 1 to 12 μm. While Rahman's cement types may include hydraulic cements, Saudi Class G hydraulic cement, non-hydraulic cements, Portland fly ash cement, Portland Pozzolan cement, Portland silica fume cement, masonry cements, mortars, EMC cements, stuccos, plastic cements, expansive cements, white blended cements, Pozzolan-lime cements, slag-lime cements, super-sulfated cements, calcium aluminate cements, calcium sulfoaluminate cements, geopolymer cements, Rasendale cements, polymer cement mortar, lime mortar, and/or pozzolana mortar, Rahman describes typically using hydraulic cement in a cementitious slurry for oil well cementing, rather than construction applications.

U.S. Pat. No. 9,802,865 to Chau et al. (Chau) discloses a nano-modified, dry-mixed, alkali-activated cementitious or one-part geopolymer cement (OPgC) material with high early strength for rapid repair of cement-based infrastructure components. Chau's material includes an aluminosilicate rich material (metakaolin, feldspar, etc.), an alkali material, and a nano-modifier, and optionally include other functional admixtures and fibers. Chau's material mixes water and fine or coarse aggregate to form mortar or concrete. Chau uses nanosilica, nanoalumina, nanoclay, and silica fume (all less than 500 nm), rather than zeolites, and prefers industrial waste materials such as blast furnace slag, ground granulated blast furnace slag, slag, steel slag, and phosphorus slag, ash from municipal solid waste incinerator, fly ash, and/or metakaolin, rather than natural pozzolans. Chau's alkali activated mixture uses 47 to 98 wt. % of slag, mainly containing CaO.

U.S. Pat. No. 9,034,101 to Ronin (Ronin) discloses a method involving subjecting crushed pozzolans to a high energy mechanical processing by grinding, whereby the pozzolan particles receive mechanical impulses. The grinding gives a compressive strength of a 2" cube of mortar of 80 wt. % Portland cement and 20 wt. % natural pozzolan in a ratio of 1:2.75 to standard sand with sufficient water to flow the mortar according to ASTM C 109, compacted under vibration and hardened at 20° C., sealed, which after 28 days is >75% of the compressive strength of a 2" cube, treated as the cube, of a mortar having a ratio of Portland cement:sand of 1:2.75 and water corresponding to 48.5% of the weight of Portland cement. Aside from requiring Portland cement, Ronin does not suggest using zeolites or alkali activators.

U.S. Pat. No. 9,919,974 to Gong et al. (Gong) discloses a composite binder with Class F fly ash material(s), gelation enhancer(s), and hardening enhancer(s), wherein each Class F fly ash material has no more than 15 wt. % CaO. Gong's composite binder is a Portland cement-free binder for concrete and can be used for Geopolymer Composite Cellular Concretes (GCCCs). Gong's material uses a ground granulated blast furnace slag and does not use a nanozeolite. Constr. Building Mater. 2019, 208, 46-62 by Najimi et al. (Najimi) discloses properties of alkali-activated concretes made with hybrid aluminosilicate precursors having different proportions of natural pozzolan, as a low calcium precursor, and blast furnace slag, as a high calcium precursor, activated with different concentrations and combinations of NaOH and $Na_2SiO_3$. Natural pozzolan to slag proportions of 70/30, 50/50, and 30/70, NaOH concentrations of 1, 1.75, and 2.5 M, and $Na_2SiO_3$ to NaOH activator proportions of 20/80, 25/75, and 30/70 were used. Najimi's concrete mixtures were tested for slump, setting time, unit weight, compressive strength, tensile strength, elastic modulus, drying shrinkage, absorption, and chloride penetration relative to Portland cement concrete. Najimi describes that 50/50 natural pozzolan to slag and 30/70 $Na_2SiO_3$ to NaOH as optimum precursor and activator combinations. Najimi does not teach the use of zeolite nanoparticles and uses pozzolan with a silica content over 59 wt % and alumina over 16 wt. %

The paper from the 13th Middle East Geosciences Conference and Exhibition in Manama, Bahrain, March 5 to 8, 2018, entitled "Performance of Synthetic Nano-Zeolite as an Additive for Oil-Well Cement" by Shakeel et al. (Shakeel) discloses high-pressure/high-temperature environment cements with different additives to enhance properties of set cement in a wellbore. Shakeel tests various zeolites as a partial replacement in the cement content, including the effect of nano-sized zeolite as a cement additive. Shakeel describes nanozeolites (NZ) having particle size less than 80 nm at 1 to 3 wt. %, with other additives, on API Class G cement, for thickening time, compressive strength development, porosity, and permeability. Shakeel reports that adding nanozeolites accelerates early age compressive strength values, while maintaining higher final strength values compared to a control mix, reaching 2,000 psi (~13.8 MPa) compressive strength in 33% less time, low permeability, low porosity, and higher thickening time. Shakeel does not use alkali activators and pozzolan, and instead uses a hydraulic cement.

In light of the above, a need remains for alkali-activated building material formulations comprising pozzolans, particularly natural pozzolans, preferably having no more than about 40 wt % silica, such as building material formulations avoiding hydraulic cements, particularly for structural elements, and methods of making and using such formulations.

BRIEF SUMMARY OF THE INVENTION

Aspects of the invention provide dry concrete compositions comprising (to a total of 100 wt. %): 10 to 30 wt. % of natural pozzolan; 0.25 to 10 wt. % of a zeolite particles having an average longest dimension of 25 to 45 nm; 20 to 50 wt. % of a fine aggregate having an average longest dimension of less than 9.55 mm; 35 to 60 wt. % a coarse aggregate having an average longest dimension of 9.55 to 100 mm; and 2.5 to 12.5 wt. % of an alkali activator comprising sodium hydroxide (NaOH) and sodium silicate ($Na_2SiO_3$), wherein the composition comprises no more than 15 wt. % hydraulic cement, and wherein the composition is suitable, when set, to provide a concrete of a compressive strength of at least 14 MPa, as determined by ASTM C109. Such compositions may be modified by any permutation of the features described herein, particularly the following.

The zeolite particles may have specific surface area in a range of from 50 to 120 $m^2/g$. The zeolite particles may have a bulk density of 1.2 to 1.8 $g/cm^3$. The zeolite particles may have a pH in a range of from 8 to 11, when suspended in water.

A weight ratio of the natural pozzolan to the zeolite nanoparticles may be in a range of from 15:1 to 35:1. A weight ratio of the coarse aggregate to the fine aggregate may be in a range of 1.5:1 to 2.3:1. A weight ratio of a total weight of the fine and coarse aggregates to a total weight of the natural pozzolan and the zeolite nanoparticles may be in a range of 4:1 to 5:1. A weight ratio of the alkali activator to the natural pozzolan may be in a range of 0.5:1 to 0.6:1. A weight ratio of the sodium silicate to the sodium hydroxide may be in a range of 1.5:1 to 4:1.

The natural pozzolan may comprise, relative to a total weight of the natural pozzolan: 35 to 45 wt. % of $SiO_2$; 8 to 16 wt. % of $Al_2O_3$; 12 to 25 wt. % of $Fe_2O_3$; 6 to 15 wt. % of CaO; 5 to 12 wt. % of MgO; 1 to 3 wt. % of $K_2O$; 2 to 7 wt. % of $Na_2O$; and/or 0.3 to 1.5 wt. % of $TiO_2$.

Inventive compositions may comprise no more than 1 wt. % hydraulic cement.

Inventive compositions may be sufficient to provide a solid having a compressive strength in a range of from 30 MPa to 70 MPa when set, as determined by ASTM C109.

The fine aggregate may comprise at least 75 wt. % dune sand, relative to total fine aggregate weight. The coarse aggregate may comprise at least 75 wt. % of crushed limestone, relative to total coarse aggregate weight.

Aspects of the invention provide wet concrete slurries, comprising: any permutation of the inventive dry concrete composition described herein; and no more than 5 wt. % water, wherein the slurries are sufficiently fluid to pour under gravity in ambient conditions. Aspects of the invention provide pozzolan concretes comprising cured forms of any of such slurries.

Inventive concretes may have a compressive strength of 20 to 50 MPa after curing at a temperature of 21 to 25° C. for 28 days, and a compressive strength of 30 to 75 MPa after curing at a temperature of 50 to 70° C. for 7 days, as determined by ASTM C109.

Inventive concretes may be cured at a temperature in a range of from 15 to 40° C. Inventive concretes may be cured at a temperature above 40° C.

Aspects of the invention provide buildings comprising any permutation of the inventive concretes described herein, preferably as a structural element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Aspects of the invention provide dry concrete compositions comprising 10 to 30 wt. % of natural pozzolan, e.g., at least 10, 11, 12, 12.5, 13, 14, 15, 16, 17, 18, 19, or 20 wt. % and/or up to 30, 29, 28, 27.5, 27, 26, 25, 24, 23, 22, 21, 20, 19, 18, or 17.5 wt. %. Inventive dry concrete compositions may comprise 0.25 to 10 wt. % of a zeolite particles, e.g., at least 0.25, 0.33, 0.4, 0.5, 0.6, 0.67, 0.75, 0.85, 1, 1.25, 1.33, 1.5, 1.67, 1.75, 2, 2.25, 2.33, 2.5, 2.67, 2.75, 3, 3.25, 3.33, 3.5, 3.67, 3.75, 4, 4.25, 4.33, 4.5, 4.67, 4.75, 5 wt. % and/or up to 10, 9.5, 9, 8.5, 8, 7.5, 7, 6.75, 6.67, 6.5, 6.33, 6.25, 6, 5.75, 5.67, 5.5, 5.33, 5.25, 5, 4.75, 4.67, 4.5, 4.33, 4.25, or 4 wt. %, having an average longest dimension of 25 to 45 nm, e.g., at least 25, 27.5, 30, 32.5, 33, 34, 35, 36, 37, 37.5, or 40 nm and/or up to 45, 42.5, 40, 39, 38, 37.5, 37, 36, 35, 34, 33, 32.5, 32, 31, or 30 nm. Inventive dry concrete compositions may comprise 20 to 50 wt. % of a fine aggregate, e.g., at least 20, 21, 22, 22.5, 23, 24, 25, 26, 27, 27.5, or 30 wt. % and/or up to 50, 47.5, 45, 42.5, 40, 37.5, 35, 32.5, 30, 27.5, or 25 wt. %, having an average longest dimension of less than 9.55 mm. Inventive dry concrete compositions may comprise 35 to 60 wt. % a coarse aggregate, e.g., at least 35, 37.5, 40, 42.5, 43, 44, 45, 46, 47, 47.5, 48, 49, or 50 wt. % and/or up to 60, 57.5, 55, 54, 53, 52.5, 52, 51, 50, 49, 48, or 47.5 wt. %, having an average longest dimension of 9.55 to 100 mm (or up to 90, 80, 75, 70, 65, 60, 55, 50, 45, 40, or 35 nm). Inventive dry concrete compositions may comprise 2.5 to 12.5 wt. % of an alkali activator, e.g., at least 2.5, 3, 3.33, 3.5, 3.67, 4, 4.33, 4.5, 4.67, 5, 5.33, 5.5, 5.67, 6, 6.33, 6.5, 6.67, 7, 7.33, 7.5, 7.67, 8, 8.33, 8.5, 8.67, 9, 9.5, or 10 wt. % and/or up to comprising sodium hydroxide (NaOH) and sodium silicate ($Na_2SiO_3$). Inventive dry concrete compositions may comprise no more than 15, 10, 7.5, 5, 4, 3, 2, 1, 0.5, 0.1, 0.01, 0.001, 0.0001, or 0.00001 wt. % hydraulic cement, and wherein the composition is suitable, when set, to provide a concrete of a compressive strength of at least 14, 15, 17.5, 20, 22.5, 25, 27.5, 30, 32.5, 35, 37.5, 40 42.5, 45, 47.5, or 50 MPa (up to, e.g., 200, 150, 125, 100, 90, 80, 75, 70, 65, or 60 MPa), as determined by ASTM C109. Additional components may be used in the inventive compositions, though certain applications may call for compositions consisting essentially of (e.g., providing set solid bulks of no less than 10, 7.5, 5, 2.5, or 1% of compositions limited to the above elements) or consisting of the pozzolan, zeolite particles, light and coarse aggregate, and alkali activators. While sodium salts are illustrated, e.g., in the alkali activators, some applications may usefully include lithium, potassium, and/or magnesium cations, in addition to or in place of sodium cations. For example, up to 40, 33.3, 30, 27.5, 22.5, 16.6, 12.5, 10, 7.5, 5, 2.5, or 1 wt. % of the sodium cations may be replaces by lithium, potassium, and/or magnesium cations.

Inventive concrete powders described herein can exclude hydraulic cements entirely, but still reach compressive/compression strengths of over 40, 42.5, 45, 47.5, or 50 MPa when set. While water may be added to inventive dry powders in any amount, inventive formulations can advantageously employ less water than traditional concrete alternatives, e.g., no more than 10, 7.5, 5, 4.5, 4, 3.5, 3, 2.75, 2.5, 2.25, 2, 1.75, 1.5, 1.4, 1.33, 1.125, 1, 0.85, 0.75, 0.67, 0.5, 0.45, or 0.40 wt. % $H_2O$, relative to total concrete formulation slurry (i.e., wet) weight. The amount of pozzolan replaced by zeolite in inventive formulations may be, e.g., at least 1, 2, 2.5, 2.75, 3, 3.125, 3.25, 3.33, 3.5, 3.67, 3.75, 4, 4.5, or 5 wt. % and/or up to 10, 9, 8, 7.5, 7, 6.5, 6, 5.5, 5.25, 5, 4.75, 4.5, 4.25, or 4 wt. %. The average sphericity of the zeolite, fine aggregate, and/or coarse aggregate, independently, may preferably be, e.g., at least 0.5, 0.55, 0.6, 0.65, 0.7, 0.75, 0.8, 0.825, 0.85, 0.875, 0.9, 0.9125, 0.925, 0.933, 0.9375, 0.945, 0.95, 0.955, 0.9625, 0.967, 0.97, 0.975, 0.98, or more.

The zeolite particles may have specific surface area in a range of from 50 to 120 $m^2/g$, e.g., at least 50, 55, 60, 62.5, 65, 67.5, 70, 72.5, 73.3, 75, 76.7, 77.5, 80, 82.5, 83.3, or 85 $m^2/g$ and/or up to 120, 115, 110, 105, 100, 97.5, 95, 92.5, 90, 87.5, 86.7, 85, 83.3, 82.5, 80, 77.5, 76.6, or 75 $m^2/g$. The zeolite particles may have a bulk density of 1.2 to 1.8 g/cm$^3$, e.g., at least 1.2, 1.25, 1.275, 1.3, 1.325, 1.333, 1.35, 1.367, 1.375, 1.4, 1.425, 1.433, or 1.45 g/cm$^3$ and/or up to 1.8, 1.75, 1.767, 1.75, 1.733, 1.725, 1.7, 1.675, 1.667, 1.65, 1.633, 1.625, 1.6, 1.575, 1.567, 1.5, 1.533, 1.525, 1.5, 1.475, 1.467, 1.45, 1.433, 1.425 1.4, 1.375, 1.367, or 1.35 g/cm$^3$. The zeolite particles may have a pH in a range of from 8 to 11, e.g., at least 8, 8.25, 8.33, 8.5, 8.67, 8.75, 9, 9.25, 9.33, 9.5 and/or up to 11, 10.75, 10.5, 10.25, 10, 9.75, 9.67, 9.5, 9.33, 9.25, or 9, when suspended in water.

A weight ratio of the natural pozzolan to the zeolite nanoparticles may be in a range of from 15:1 to 35:1, e.g., at least 15, 16, 17, 18, 19, 20, 21, 22, or 22.5 to 1 and/or up to 35, 34, 33, 32.5, 32, 31, 30, 29, 28, 27.5, 27, 26, or 25 to 1. The silica ratio (or silica modulus), defined as the quotient of $SiO_2/(Al_2O_3+Fe_2O_3)$, of inventive formulations may be, for example, at least 2.9, 2.95, 3, 3.05, 3.1, 3.15, 3.2, 3.25, 3.3, 3.35, 3.4, 3.45, or 3.5 and/or up to 4, 3.9, 3.8, 3.75, 3.7, 3.65, 3.6, 3.55, 3.5, 3.45, 3.4, 3.35, or 3.3.

A weight ratio of the coarse aggregate to the fine aggregate may be in a range of 1.5:1 to 2.3:1, e.g., 1.5, 1.55, 1.6, 1.65, 1.7, 1.75, 1.8, 1.85, 1.9, 1.95, or 2 to 1 and/or up to 2.3, 2.25, 2.2, 2.15, 2.1, 2.05, 2, 1.95, 1.9, or 1.85 to 1.

A weight ratio of a total weight of the fine and coarse aggregates to a total weight of the natural pozzolan and the zeolite nanoparticles may be in a range of 4:1 to 5:1, e.g., at least 4, 4.033, 4.05, 4.067, 4.1, 4.133, 4.15, 4.167, 4.2, 4.233, 4.25, 4.267, 4.3, 4.333, 4.35, 4.367, 4.4, 4.433, 4.45, 4.467, 4.5 to 1 and/or 5, 4.975, 4.95, 4.925, 4.9, 4.875, 4.85, 4.825, 4.8, 4.775, 4.75, 4.725, 4.7, 4.675, 4.65, 4.625, 4.6, 4.575, 4.55, 4.525, or 4.5 to 1.

A weight ratio of the alkali activator to the natural pozzolan may be in a range of 0.5:1 to 0.6:1, e.g., 0.5, 0.51, 0.52, 0.53, 0.54, 0.55, 0.56 to 1 and/or up to 0.6, 0.59, 0.58, 0.57, 0.56, 0.55, or 0.54 to 1.

A weight ratio of the sodium silicate to the sodium hydroxide may be in a range of 1.5:1 to 4:1, e.g., at least 1.5, 1.6, 1.7, 1.8, 1.9, 2, 2.1, 2.2, 2.25, 2.3, 2.4, 2.5, 2.6, 2.7, 2.75, 2.8, 2.9, or 3 to 1 and/or up to 4, 3.9, 3.8, 3.75, 3.7, 3.6, 3.5, 3.4, 3.3, 3.25, 3.2, 3.1, or 3 to 1.

The natural pozzolan may comprise, relative to the total natural pozzolan weight, 35 to 45 wt. % of $SiO_2$, e.g., at least 35, 36, 37, 37.5, 38, 39, or 40 wt. % $SiO_2$ and/or up to 45, 44, 43, 42.5, 42, 41, or 40 wt. % $SiO_2$. The natural pozzolan may comprise, relative to the total natural pozzolan weight, 8 to 16 wt. % of $Al_2O_3$, e.g., at least 8, 8.5, 9, 9.5, 10, 10.5, 11, 11.5, or 12 wt. % $Al_2O_3$ and/or up to 16, 15.5, 15, 14.5, 14, 13.5, 13, 12.5, 12, 11.5, or 11 wt. % $Al_2O_3$. The natural pozzolan may comprise, relative to the total natural pozzolan weight, 12 to 25 wt. % of $Fe_2O_3$, e.g., at least 12, 12.5, 13, 13.5, 14, 14.5, 15, 15.5, 16, 16.5, 17, or 17.5, wt. % $Fe_2O_3$ and/or up to 25, 24.5, 24, 23.5, 23, 22.5, 22, 21.5, 21, 20.5, 20, 19.5, 19, 18.5, 18, or 17.5 wt. % $Fe_2O_3$. The natural pozzolan may comprise, relative to the total natural pozzolan weight, 6 to 15 wt. % of CaO, e.g., at least 6, 6.5, 7, 7.5, 8, 8.5, 9, 9.5, 10, 10.5, or 11 wt. % CaO and/or up to 15, 14.5, 14, 13.5, 13, 12.5, 12, 11.5, 11, 10.5, or 10 wt. % CaO. The natural pozzolan may comprise, relative to the total natural pozzolan weight, 5 to 12 wt. % of MgO, e.g., at least 5, 5.5, 6, 6.5, 7, 7.5, 8, 8.5, or 9 wt. % MgO and/or up to 12, 11.5, 11, 10.5, 10, 9.5, 9, 8.5, or 8 wt. % MgO. The natural pozzolan may comprise, relative to the total natural pozzolan weight, 1 to 3 wt. % of $K_2O$, e.g., at least 1, 1.1, 1.2, 1.3, 1.4, 1.45, 1.5, 1.55, 1.6, or 1.65 wt. % $K_2O$ and/or up to 3, 2.9, 2.8, 2.7, 2.6, 2.5, 2.4, 2.3, 2.2, 2.1, or 2 wt. % $K_2O$. The natural pozzolan may comprise, relative to the total natural pozzolan weight, 2 to 7 wt. % of $Na_2O$, e.g., at least 2, 2.25, 2.5, 2.75, 3, 3.25, 3.5, 3.75, 4, 4.25, 4.5, 4.75, 5, 5.25, 5.5, 5.75, 6 wt. % $Na_2O$ and/or up to 7, 6.5, 6, 5.5, 5, 4.75, 4.67, 4.5, 4.33, 4.25, 4, 3.75, 3.67, 3.5, 3.33, 3.25, or 3 wt. % $Na_2O$. The natural pozzolan may comprise, relative to the total natural pozzolan weight, 0.3 to 1.5 wt. % of $TiO_2$, e.g., at least 0.3, 0.35, 0.4, 0.425, 0.45, 0.475, 0.5, 0.525, 0.55, 0.575, 0.6, 0.625, or 0.65 wt. % $TiO_2$ and/or up to 1.5, 1.4, 1.3, 1.25, 1.1, 1.0, 0.95, 0.9, 0.85, 0.8, or 0.75 wt. % $TiO_2$.

Inventive compositions may comprise no more than 1, 0.75, 0.5, 0.55, 0.1, 0.05, 0.01, 0.005, 0.001, 0.0005, 0.0001, 0.00005, or 0.00001 wt. % hydraulic cement.

Inventive compositions may be sufficient to provide a solid having a compressive strength in a range of from 30 MPa to 70 MPa when set, i.e., set concrete bulk mass, as determined by ASTM C109. For example the compression strength may be at least 30, 32.5, 33.3, 35, 36.7, 37.5, 40, 41.125, 42.5, 43.3, 43.625, 45, 46.125, 46.7, 47.5, 47.875, 50, 51.125, 52.5, 53.3, or 55 MPa.

The fine aggregate may comprise at least 75, 80, 85, 90, 92.5, 95, 97.5, 98, 99, 99.1, 99.5, or 99.9 wt. % dune sand (or any other fine aggregate or mixture described below), relative to total fine aggregate weight. The coarse aggregate may comprise at least 75, 80, 85, 90, 92.5, 95, 97.5, 98, 99, 99.1, 99.5, or 99.9 wt. % of crushed limestone (or any other coarse aggregate or mixture described below), relative to total coarse aggregate weight.

Aspects of the invention provide wet concrete slurries, comprising: any permutation of the inventive dry concrete composition described herein; and no more than 5, 4, 3, 2.5, 2, 1, 0.5, 0.1, 0.01, 0.001, 0.0001, or 0.00001 wt. % water, wherein the slurries are sufficiently fluid to pour under gravity in ambient conditions, i.e., flow substantially like customary concrete slurries/Bingham fluids. Aspects of the invention provide pozzolan concretes comprising cured forms of any of such slurries. The concretes may be directly poured as wall, foundation, floor, or column elements, and/or may be premade blocks or pavers.

Inventive concretes may have a compressive strength of 20 to 50 MPa (e.g., at least 20, 22.5, 25, 27.5, 30, 32.5, 35, 37.5, 40, 42.5, or 45 MPa) after curing at a temperature of 21 to 25° C. for 28 days, and a compressive strength of 30 to 75 MPa (e.g., at least 30, 32.5, 35, 37.5, 40, 42.5, 45, 47.5, 50, 52.5, or 50 MPa) after curing at a temperature of 50 to 70° C. for 7 days, as determined by ASTM C109.

Inventive concretes may be cured at a temperature in a range of from 15 to 40° C., i.e., at ambient (outdoor) temperatures. Such ambient temperatures may be at least 10, 12.5, 15, 17.5, or 20° C. and/or up to 40, 37.5, 35, 32.5, or 30° C. Inventive concretes may be cured at a temperature above 40° C., i.e., set in an over, kiln, or low heating arrangement.

Aspects of the invention provide buildings comprising any permutation of the inventive concretes described herein, preferably as a structural element, such as a wall or wall element (block, brick, etc.), floor or floor element (tile, brick, etc.), poured cement stairwell, etc.

Aspects of the invention provide structural concretes with compression strengths in the range of from 5000 to 6000 psi (35 to 41 MPa) or higher, e.g., up to 100, 90, 80, 75, 70, 65, 62.5, 60, 57.5, 55, 52.5, 50, 47.5, 45, or 42.5 MPa.

Inventive formulations may use pozzolans containing, for example, at least 2.5, 3.5, 4, 5, 6, 7, 7.5, 8, 8.5, 9, 9.5, 10, 10.5, 11, or 11.5 wt. % CaO and/or up to 15, 14.5, 14, 13.5, 13, 12.5, 12, 11.5, or 11 wt. % CaO. Inventive formulations may use pozzolans containing, for example, at least 5, 7.5, 10, 12.5, 15, 17.5, 20, 22.5, or 25 wt. % $SiO_2$ and/or up to 55, 52.5, 50, 47.5, 45, 42.5, 42, 41.5, 41, 40.5, 40% $SiO_2$.

Inventive formulations may use pozzolans containing, for example, at least 10, 12.5, 13, 14, 15, 16, 17, or 17.5 wt. % $Fe_2O_3$ and/or up to 25, 22.5, 22, 21, 20, 19, 18, or 17.5 wt. % $Fe_2O_3$. Inventive formulations may use pozzolans containing, for example, at least 1, 2, 2.5, 3, 3.5, 4, 4.5, 5, 5.5, 6, 6.25, 6.5, 6.75, 7, 7.25, 7.5, 7.75, 8, or 8.25 wt. % MgO and/or up to 12.5, 12, 11.5, 11, 10.5, 10, 9.75, 9.5, 9.25, 9, 8.75, 8.5, 8.25, or 8 wt. % MgO. Inventive formulations may use pozzolans containing, for example, at least 0.25, 0.33, 0.5, 0.67, 0.75, 1, 1.25, 1.33, 1.5, 1.67, or 1.75 wt. % $K_2O$ and/or up to 3, 2.75, 2.67, 2.5, 2.33, 2.25, 2.15, 2, 1.75, or 1.67 wt. % $K_2O$. Inventive formulations may use pozzolans containing, for example, at least 1.25, 1.33, 1.5, 1.67, 1.75, 2, 2.25, 2.33, 2.5, 2.67, 2.75, 3, 3.25, 2.33, 3.5, or 3.67 wt. % $K_2O$ and/or up to 5, 4.75, 4.67, 4.5, 4.33, 4.25, 4.15, 4, 3.75, 3.67, or 3.5 wt. % $K_2O$. Inventive formulations may use pozzolans containing, for example, at least 0.25, 0.33, 0.5, 0.67, 0.75, 0.875, 1, 1.125, 1.25, 1.33, or 1.5 wt. % $P_2O_5$ and/or up to 3, 2.75, 2.67, 2.5, 2.33, 2.25, 2.125, 2, 1.875, 1.75, 1.67, 1.5, or 1.375 wt. % $P_2O_5$. Inventive formulations may use pozzolans containing, for example, at least 0.1, 0.15, 0.2, 0.25, 0.33, 0.35, 0.4, 0.45, 0.5, 0.55, 0.6, 0.625, 0.65, or 0.67 wt. % $TiO_2$ and/or up to 1.67, 1.6, 1.5, 1.4, 1.35, 1.3, 1.25, 1.2, 1.15, 1.1, 1.05, 1, 0.95, 0.9, 0.85, 0.8, 0.75, 0.7, or 0.67 wt. % $TiO_2$. Inventive formulations may use pozzolans containing, for example, at least 2.5, 5, 6, 7, 8, 9, 10, 10.5, 11, 11.5, 12, 12.25, 12.5, or 12.75 wt. % and/or up to 16, 15.5, 15, 14.5, 14, 13.75, 13.5, 13.25, 13, 12.75, 12.5, 12.25, or 12 wt. % $Al_2O_3$. Inventive materials generally have more than 15, 16, 17, 17.5, 18, 19, or 20 wt. % MgO+CaO.

Useful zeolite additives may have a solids content of, e.g., at least 33, 35, 37.5, 40, 42.5, 45, 47.5, or 50% and/or up to 65, 62.5, 60, 57.5, 55, 52.5, or 50%. Useful zeolites may have an average particle size of, e.g., at least 15, 17.5, 20, 22.5, 25, 27.5, 30, 32.5, 35, 37.5, or 40 nm and/or up to 100, 85, 75, 60, 57.5, 55, 52.5, 50, 47.5, 45, 42.5, 40, 37.5, or 35 nm. Zeolites useful within the scope of the invention may have bulk densities of, e.g., at least 1.0, 1.05, 1.1, 1.15, 1.2, 1.225, 1.25, 1.275, 1.3, 1.325, 1.35, 1.375, 1.4, 1.425, or 1.45 g/cm³ and/or up to 1.8, 1.75, 1.725, 1.7, 1.675, 1.65, 1.625, 1.6, 1.575, 1.55, 1.525, 1.5, 1.475, 1.45, 1.425, 1.4, 1.375, or 1.35 g/cm³. Zeolites useful within the scope of the invention may have specific surface areas of, e.g., at least 50, 55, 57.5, 60, 62.5, 65, 67.5, 70, 72.5, 75, 77.5, 80, 82.5, or 85 m²/g and/or 125, 120, 115, 110, 105, 102.5, 100, 97.5, 95, 92.5, 90, 87.5, 85, 82.5, 80, 77.5, or 75 m²/g. A pH of useful zeolites in water is preferably basic, but may also be neutral, or even acidic, and may have a pH in a range of, e.g., at least 7.5, 7.75, 8, 8.25, 8.5, 8.75, 9, 9.25, 9.5, 9.75, or 10 and/or up to 12, 11.5, 11, 10.75, 10.5, 10.25, 10, 9.75, 9.5, 9.25, or 9.

Inventive formulations may use alkali activator combinations, $Na_2SiO_3$ to NaOH, in weight ratios in a range of from at least 2, 2.05, 2.1, 2.15, 2.2, 2.25, 2.3, 2.35, 2.4, 2.45, 2.5, 2.55, 2.6, 2.65, 2.7, 2.75 and/or up to 4, 3.9, 3.8, 3.75, 3.7, 3.6, 3.5, 3.4, 3.3, 3.25, 3.2, 3.1, 3.0, 2.9, 2.8, 2.75, 2.7, 2.6, 2.5, 2.4, 2.3, or 2.25 to 1.

Inventive formulations may use a coarse aggregate, such as crushed carbonate (limestone, dolomite, marl, chalk, etc.), sandstone (quartzite, graywacke, subgraywacke, arkose, etc.), claystone, siltstone, argilite, shale, chert, sand, marble, metaquartzite, slate, phyllite, schist, amphibolite, homfels, gneiss, serpentine, granite, syenite, diorite, gabbro, peridotite, pegmatite, volcanic glass (obsidian, pumice, scoria, tuff, perlite, pitchstone, etc.), felsite, basalt, silica (quartz, opal, chalcedony, tridymite, cristobalite, etc.), silicates (feldspars, ferromagnesian [hornblende, augite, etc.], clay [illites, kaolins, chlorites, montmorillonites, etc.], mica, zeolite, etc.), carbonates (calcite, dolomite, etc.), sulfate (gypsum, anhydrite, etc.), iron sulfides (pyrrite, marcasite, pyrrhotite, etc.), iron oxide (magnetite, hematite, goethite, imenite, limonite, etc.), synthetic aggregates (thermally processed materials, expanded clays, shales, slages, fly ash, etc.), recycled aggregates (municipal wastes, recycled building materials, recycled pavements, etc.), or combinations of two or more of any of these, retained by a ⅜" sieve, i.e., having a longest particle dimension in a range of from ⅜" (ca. 9.5 or 10 mm) to 1.5" (ca. 38.1 or 40 mm), e.g., at least 9.5, 10, 11, 12.5, 15, 17.5, or 20 mm and/or up to 40, 38.5, 37.5, 35, 32.5, 30, 27.5, 25, 22.5, 20, 17.5, or 15 mm. Inventive formulations may use a fine aggregate, such as (dune) sand and/or any of the materials used as coarse aggregate(s), passing through a ⅜" sieve, i.e., having an longest particle dimension of no more than 9.55, 9.5, 9.25, 9, 8.75, 8.5, 8.25, 8, 7.75, 7.5, 7.25, 7, 6.75, 6.5, 6.25, 6, 5.75, 5.5, 5.25, 5, 4.75, 4.5, 4.25, 4, 3.75, 3.5, 3.25, 3, 2.75, 2.5, 2.25, 2, 1.75, 1.5, 1.25, 1, 0.75, 0.5, or 0.25 mm, and generally at least 0.05, 0.1, 0.15, 0.2, or 0.25 mm. Concretes containing sandstone or slate generally produce a high shrinkage concrete, and granite, limestone, and quartz are low shrinkage-producing aggregates, which may be relevant for certain applications.

Inventive concretes may have a unit weight of, e.g., at least 2300, 2305, 2310, 2315, 2320, 2325, 2330, 2335, 2340, 2345, or 2350 kg/m³ and/or up to 2500, 2450, 2425, 2400, 2390, 2380, 2375, 2370, 2365, or 2360 kg/m³. The pozzolan content of inventive concretes (set) may be in a range of, e.g., at least 10, 11, 12, 12.5, 13, 13.5, 14, 14.5, 15, 15.5, or 16 wt. % and/or up to 20, 19, 18, 17.5, 17, 16.5, 16, 15.5, or 15 wt. %, relative to total set concrete weight. The nanozeolite content of inventive concretes (set) may be in a range of, e.g., at least 0.25, 0.33, 0.5, 0.67, 0.75, 1, 1.5, 2, 2.25, 2.5, 2.75, 3, 3.25, 3.5, 3.75, 4, 4.25, 4.5, 4.75, 5, 5.25, 5.5, 5.75, or 6 wt. % and/or up to 20, 17.5, 15, 12.5, 11.25, 10, 9, 8, 7.5, 7, 6.5, 6, 5.5, or 5 wt. %, relative to total set concrete weight. The sodium silicate, $Na_2SiO_3$, content of inventive concretes (set) may be in a range of, e.g., at least 3, 3.5, 4, 4.5, 5, 5.5, 6, or 6.5 wt. % and/or up to 10, 9.5, 9, 8.5, 8, 7.5, 7, 6.5, or 6 wt. %, relative to total set concrete weight. The sodium hydroxide, NaOH, content of inventive concretes (set) may be in a range of, e.g., at least 0.5, 0.75, 1, 1.25, 1.5, 1.75, 2, 2.25, 2.5, 2.75, 3, 3.25, or 3.5 wt. % and/or up to 10, 9, 8, 7.5, 7, 6.5, 6, 5.5, 5, 4.75, 4.5, 4.25, 4, 3.67, 3.5, 3.33, 3, or 2.5 wt. %, relative to total set concrete weight. The fine aggregate content of inventive concretes (set) may be in a range of, e.g., at least 15, 17.5, 20, 21, 22, 22.5, 23, 23.5, 24, 24.5, 25, 25.5, 26, 26.5, 27, or 27.5 wt. % and/or up to 40, 35, 32.5, 32, 31, 30, 29.5, 29, 28.5, 28, 27.5, 27, 26.5, 26, 25.5, or 25 wt. %, relative to total set concrete weight. The coarse aggregate content of inventive concretes (set) may be in a range of, e.g., at least 30, 35, 37.5, 40, 42.5, 43, 44, 44.5, 45, 45.5, 46, 46.5, 47, 47.5, 48, 48.5, 49, 49.5, or 50 wt. % and/or up to 65, 60, 57.5, 55, 52.5, 52, 51, 50, 49.5, 49, 48.5, 48, or 47.5 wt. %, relative to total set concrete weight. Concrete slurries containing inventive formulations, which flow sufficiently for pouring under gravity, may require no more than 10, 7.5, 5, 4, 3, 2.5, 2, 1, 0.75, 0.67, 0.6, 0.5, or 0.45 wt. % $H_2O$.

Inventive formulations may exclude or may contain no more than 15, 10, 7.5, 5, 4, 3, 2, 1, or 0.5 wt. %, relative to the total solids or formulation weight, of clay mineral(s) and/or feldspars, such as bentonite ($H_2Al_2O_6Si$), halloysite ($H_4Al_2O_9Si_2.2H_2O$), kaolin ($Al_2Si_2O_5(OH)_4$), montmorillonite ((Na,Ca)$_{0.33}$(Al,Mg)$_2$(Si$_4$O$_{10}$)(OH)$_2$·nH$_2$O), nepheline ((Na,K)AlSiO$_4$), quartz, and/or CaCO$_3$, individually or in combination.

Inventive formulations may exclude or may contain no more than 15, 10, 7.5, 5, 4, 3, 2, 1, or 0.5 wt. %, relative to the total solids or formulation weight, of industrial slag(s), such as blast furnace slag, ground granulated blast furnace slag, slag, steel slag, and phosphorus slag, ash from municipal solid waste incinerator, and/or fly ash, individually or in combination.

Inventive formulations may exclude or may contain no more 40, 33, 25, 20, 15, 10, 7.5, 5, 4, 3, 2, 1, or 0.5 wt. %, relative to the total solids or formulation weight, of hydraulic cement, such as Portland cement types API Class A, Class G, and/or Class H; Ordinary Portland Cement (OPC, ASTM CI50 standard) type I, type II, type III, type IV, and/or type V; Portland Cement type Ia, type IIa, and/or type IIa, having an air-entraining agent; Saudi Class G hydraulic cement; non-hydraulic cements; Portland fly ash cement; Portland pozzolan cement, Portland silica fume cement, masonry cements, mortars, EMC cements, stuccos, plastic cements, expansive cements, white blended cements, Pozzolan-lime cements, slag-lime cements, supersulfated cements, calcium aluminate cements, calcium sulfoaluminate cements, geopolymer cements, Rosendale cements, polymer cement mortar, lime mortar, and/or pozzolana mortar, individually or in combination.

Inventive formulations may exclude or may contain no more 40, 33, 25, 20, 15, 10, 7.5, 5, 4, 3, 2, 1, or 0.5 wt. %, relative to the total solids or formulation weight, of setting retarders, such as boric acid, borax, alkali citrate, barium hydroxide, barium chloride, barium nitrate, zinc nitrate, alkali phosphate compounds (e.g., sodium meta phosphate), and/or accelerators, such as alkali fluoride, calcium salts, alkali oxalate, individually or in combination.

Inventive cements and/or concretes may replace, e.g., at least 15, 20, 25, 33, 40, 50, 60, 67, or 75 wt. % and/or up to 100 99.9, 99.5, 99, 98.5, 98, 97.5, 95, 92.5, 90, 85, 80, 75, 67, or 60 wt. % of the Portland cement in the concrete mix with one or more pozzolanic materials. Aspects of the invention can employ one or more pozzolan materials to modify setting, increase durability, increase compressive strength, increase binder density, improve chemical resistance (e.g., to sulfurous acid, acid rain, and the like), reduce cost, and/or reduce pollution, e.g., without significantly (no more than 25, 20, 15, 12.5, 10, 7.5, 5, 4, 3, 2, 1, 0.5, or 0.1%) reducing the final compressive strength or other performance characteristics.

Aspects of the invention provide natural pozzolan-based binders, particularly having improved properties and enabling them to be cured at ambient conditions, by the addition of nanozeolite (NZ) particles. Aspects of the invention include nanozeolite-modified "green" concrete, using alkali-activated pozzolan without any ordinary Portland cement, which may nonetheless be useful for structures, both in precast and cast-in-place applications.

Aspects of the invention may increase the maximum compressive strength of thermally cured and/or room temperature cured alkali-activated cement or concrete prepared without nanozeolite (NZ). Aspects of the invention may induce faster strength development for inventive concretes cured at elevated temperature and/or at room temperature, relative to mixtures without nanozeolite (NZ). Alkali-activated cement or concretes prepared with, e.g., at least 0.5, 0.75, 1, 1.5, 2, 2.5, 3, 3.5, 4, 4.5, 5, or 7.5 wt. % and/or up to 10, 9.5, 9, 8.5, 8, 7.5, 7, 6.5, 6, 5.5, and 5 wt. % exhibited enhancement in strength compared to control mixtures, without additive, when cured at both the elevated-temperature and ambient regimes. Inventive concretes may be used for structural purposes, reaching strengths of at least 35, 36, 37, 38, 39, 40, 41, 42.5, or 45 MPa and/or up to 65, 60, 57.5, 55, 52.5, 50, 47.5, 45 MPa when cured in an oven, and at least 25, 26, 27, 27.5, 28, 29, 30, 31, 32.5, or 35 MPa and/or up to 55, 50, 47.5, 45, 42.5, 40, 37.5, or 35 MPa when cured at room temperature. The microstructure of alkali-activated concrete (AAC) modified with, e.g., 3 or 5 wt. % nanozeolite (NZ) may have a denser matrix and/or may be more compact, which may be due to enhanced transformation of source material in to polymeric compounds. Microstructure of alkali-activated concrete (AAC) prepared without nanozeolite (NZ) may be relatively more discrete and/or non-uniform.

Aspects of the invention provide cement or concrete mixtures may provide (i) environmentally friendlier concrete production by partially (e.g., at least 50, 60, 70, 75, 80, 85, 90, 91, 92, 92.5, 93, 94, 95, 96, 97, 97.5, 98, 99, 99.1, 99.5, or 99.9 wt. %) or totally replacing ordinary Portland cement (OPC), (ii) reducing greenhouse gas emissions relative to the production of ordinary Portland cement (OPC), (iii) using source materials naturally available, such as natural pozzolan, (iv) reducing energy consumption, (v) improved concretes for structural applications, (vi) concrete that, rather than or in addition to developing strength when cured at elevated temperature, gains significant strength at elevated temperature and sufficient strength when cured at room temperature, by incorporating nanozeolite (NZ), and/or (vii) reducing maintenance cost of structures.

Pozzolans are a class of siliceous or siliceous and aluminous materials which alone have little or no cementitious value, but, in finely divided form and in the presence of water, chemically react with calcium hydroxide, Ca(OH)$_2$, at ambient temperatures to form compounds with cementitious properties. The capacity of pozzolans to react with calcium hydroxide and water is quantified by its "pozzolanic activity." Pozzolana are naturally occurring pozzolans of volcanic origin. Both natural and artificial materials show pozzolanic activity and can be used as supplementary cementitious materials. Artificial pozzolans can be produced, e.g., by thermal activation of kaolin-clays to obtain metakaolin, or as waste or by-products, e.g., as fly ash from coal-fired electricity generation, silica fume from silicon smelting, highly reactive metakaolin, burned organic matter residues rich in silica such as rice husk ash, etc. Volcanic ashes and pumices largely composed of volcanic glass can be sources of pozzolans, as can deposits of modified volcanic glass converted to zeolites by interaction with alkaline waters, as can diatomaceous earths from accumulated siliceous diatom skeletons.

Zeolites are aluminosilicate minerals having a variety of chemical formulas and unit cell structures. The zeolite structural group (Nickel-Strunz classification) includes 09.GA, i.e., zeolites with T$_5$O$_{10}$ units, wherein T is combined Si and Al, including fibrous zeolites, such as natrolite framework (NAT) zeolites—gonnardite, natrolite, mesolite, paranatrolite, scolecite, tetranatrolite, etc., edingtonite framework (EDI) zeolites—edingtonite, kalborsite, thomsonite framework (THO) zeolites—thomsonite-series; 09.GB, i.e., zeolites with chains of single connected 4-membered rings, including analcime framework (ANA) zeolites—analcime, leucite, pollucite, wairakite, laumontite (LAU) zeolites, yugawaralite (YUG) zeolites, goosecreekite (GOO) zeolites, montesommaite (MON) zeolites; 09.GC, i.e., zeolites with chains of doubly connected 4-membered rings, including phillipsite framework (PHI) zeolites—harmotome, phillipsite-series, gismondine framework (GIS) zeolites—amicite, gismondine, garronite, gobbinsite, boggsite (BOG) zeolites, merlinoite (MER) zeolites, mazzite-series (MAZ) zeolites, paulingite-series (PAU) zeolites, perlialite (Linde type L framework, zeolite L, LTL); 09.GD, i.e., zeolites with chains of 6-membered rings—tabular zeolites, such as chabazite framework (CHA) zeolites—chabazite-series, herschelite, willhendersonite, SSZ-13, faujasite framework (FAU) zeolites—faujasite-series, Linde type X (zeolite X, X zeolites), Linde type Y (zeolite Y, Y zeolites), mordenite framework (MOR) zeolites—maricopaite, mordenite, offretite-wenkite subgroup zeolites—offretite (OFF), wenkite (WEN), Bellbergite (TMA-E, Aiello and Barrer; framework type EAB), bikitaite (BIK), erionite-series (ERI), ferrierite (FER), gmelinite (GME), levyne-series (LEV), dachiardite-series (DAC), epistilbite (EPI); 09.GE, i.e., zeolites with chains of $T_{10}O_{20}$ tetrahedra, wherein T is combined Si and Al, including heulandite framework (HEU) zeolites—clinoptilolite, heulandite-series, stilbite framework (STI) zeolites—barrerite, stellerite, stilbite-series, brewsterite framework (BRE) zeolites—brewsterite-series; as well as cowlesite zeolites, pentasil zeolites (also known as ZSM-5, framework type MFI), tschernichite zeolites (beta polymorph A, disordered framework, BEA), Linde type A framework zeolites (zeolite A, LTA), and the like. Selected mineral formulas may include $Na_2Al_2Si_3O_{10} \cdot 2H_2O$ (natrolite), $NaAlSi_2O_6 \cdot H_2O$ (analcime), $Na_8(Si_{28}Al_8)O_{72} \cdot 26(H_2O)$ (barrerite), $(Ca,K_2,Na_2)_2[Al_2Si_4O_{12}]_2 \cdot 12H_2O$ (chabazite), $(Na,K,Ca)_{2-3}Al_3(Al,Si)_2Si_{13}O_{36} \cdot 12H_2O$ (clinoptilolite), $Na_4(Si_8Al_4)O_{24} \cdot 11H_2O$ (gmelinite), $Na_5(Si_{11}Al_5)O_{32} \cdot 11H_2O$ (gobbinsite), $(Na,Ca)_2(Si,Al)_5O_{10} \cdot 3H_2O$ (gonnardite), $(Ca,Na)_{2-3}Al_3(Al,Si)_2Si_{13}O_{36} \cdot 12H_2O$ (heulandite), $Na_2Al_2Si_3O_{10} \cdot 2H_2O$ (natrolite), $(Ca,Na_2,K_2)_3Al_6Si_{10}O_{32} \cdot 12H_2O$ (phillipsite), $Ca_4(Si_{28}Al_8)O_{72} \cdot 28(H_2O)$ (stellerite), $NaCa_4(Si_{27}Al_9)O_{72} \cdot 28(H_2O)$ (stilbite-Ca), $Na_9(Si_{27}Al_9)O_{72} \cdot 28(H_2O)$ (stilbite-Na), $Na_2AlSi_3O_8(OH)$ (ussingite), etc., as well as variations of such formulas.

Exemplary zeolites may include amicite, ammonioleucite, analcime, barrerite, brewsterite, bellbergite, bikitaite, boggsite, chabazite, chiavennite, clinoptilolite, cowlesite, dachiardite, edingtonite, epistilbite, erionite, faujasite, ferrierite, garronite, gaultite, gismondine, gmelinite, gobbinsite, gonnardite, goosecreekite, gottardiite, harmotome, heulandite, hsianghualite, kalborsite, laumontite, leucite, lvyne, lovdarite, marciopaite, mazzite, merlinoite, mesolite, montesommaite, mordenite, mutinaite, nabesite, natrolite, offretite, pahasapaite, paranatrolite, parthdite, paulingite, perlialite, phillipsite, pollucite, roggianite, scolecite, stellerite, stilbite, terranovaite, tetranatrolite, thomsonite, tschemichite, tschortnerite, tvedalite, wairakite, weinebeneite, willhendersonite, yugawaralite, ZEOLITE A, ZEOLITE X, ZEOLITE Y, ZEOLITE K-G, ZEOLITE ZKS, ZEOLITE BETA, ZEOLITE ZK-4, SAPO, ALPO, USY, ZEOLITE ZSM-5 ("ZEOLITES SOCONY MOBIL-5" also referred to as ZSM-5), ZSM-11, ZSM-12, ZSM-20, ZSM-23, ZSM-35, ZSM-38, ZSM-50, or mixtures of two or more of these.

Relevant zeolite nanoparticles may having a formula $M_{a/n}[(AlO_2)_2(SiO_2)_e] \cdot xH_2O$, wherein M is a metal such as Na, K, Li, Ag, Ca, Ba, Fe, or the like, and x represents the water molecules incorporated into the zeolite unit cell.

EXAMPLES

MATERIALS: Natural pozzolan, the main precursor material used herein, was in powdered form from volcanic rock. The chemical composition of the natural pozzolan is provided below in Table 1.

TABLE 1

The chemical composition of the natural pozzolan used in the Examples (LOI means "loss on ignition").

| Oxides | $SiO_2$ | $Al_2O_3$ | $Fe_2O_3$ | CaO | MgO | $K_2O$ | $Na_2O$ | $P_2O_5$ | $TiO_2$ | LOI |
|---|---|---|---|---|---|---|---|---|---|---|
| weight % | 40.48 | 12.90 | 17.62 | 11.83 | 8.33 | 1.67 | 3.60 | 1.37 | 0.60 | 1.6 |

The chemical composition of nanozeolite (NZ) used in the Examples is provided below in Table 2. Zeolites are a class of aluminosilicate minerals that may have a mineral formula of $Na_2Al_2Si_3O_{10} \cdot 2H_2O$ (natrolite), $NaAlSi_2O_6 \cdot H_2O$ (analcime), $Na_8(Si_{28}Al_8)O_{72} \cdot 26(H_2O)$ (barrerite), $(Ca,K_2,Na_2)_2[Al_2Si_4O_{12}]_2 \cdot 12H_2O$ (chabazite), $(Na,K,Ca)_{2-3}Al_3(Al,Si)_2Si_{13}O_{36} \cdot 12H_2O$ (clinoptilolite), $Na_4(Si_8Al_4)O_{24} \cdot 11H_2O$ (gmelinite), $Na_5(Si_{11}Al_5)O_{32} \cdot 11H_2O$ (gobbinsite), $(Na,Ca)_2(Si,Al)_5O_{10} \cdot 3H_2O$ (gonnardite), $(Ca,Na)_{2-3}Al_3(Al,Si)_2Si_{13}O_{36} \cdot 12H_2O$ (heulandite), $Na_2Al_2Si_3O_{10} \cdot 2H_2O$ (natrolite), $(Ca,Na_2,K_2)_3Al_6Si_{10}O_{32} \cdot 12H_2O$ (phillipsite), $Ca_4(Si_{28}Al_8)O_{72} \cdot 28(H_2O)$ (stellerite), $NaCa_4(Si_{27}Al_9)O_{72} \cdot 28(H_2O)$ (stilbite-Ca), $Na_9(Si_{27}Al_9)O_{72} \cdot 28(H_2O)$ (stilbite-Na), $Na_2AlSi_3O_8(OH)$ (ussingite), etc., as well as variations of such formulas.

TABLE 2

The properties of nanozeolite used in the Examples.

| Solids content, % | Avg. Particle size, nm | Bulk density, g/cm$^3$ | Specific surface area, m$^2$/g | $Na_2O$ content, % | Viscosity cps | pH |
|---|---|---|---|---|---|---|
| 50 | 35 | 1.4 | 80 | 0.2 | 15 | 9.5 |

A 14 M aq. NaOH solution and $Na_2SiO_3$ of 3.3 silica modulus were used as alkaline activators. The sodium silicate is composed from: 62.5 wt. % $H_2O$; 28.75 wt. % $SiO_2$; and 8.75 wt. % $Na_2O$. Crushed limestone, having specific gravity of 2.56 g/cm$^3$, was used as coarse aggregate, while dune sand having specific gravity of 2.62 g/cm$^3$ was utilized as fine aggregate in the concrete mixtures.

Table 3, below, shows the quantities of constituent materials of in the exemplary formulations prepared by incorporating nanozeolite (NZ).

TABLE 3

The quantities of alkali-activated concrete (AAC) mix constituents.

| Sample | NP, kg/m$^3$ | NZ, kg/m$^3$ | $Na_2SiO_3$, kg/m$^3$ | NaOH kg/m$^3$ | H2O, kg/m$^3$ | FA, kg/m$^3$ | CA, kg/m$^3$ |
|---|---|---|---|---|---|---|---|
| 0%-NZ | 400 | 0 | 150 | 60 | 10 | 650 | 1206 |
| 3%-NZ | 388 | 12 | 150 | 60 | 10 | 646 | 1200 |
| 5%-NZ | 380 | 20 | 150 | 60 | 10 | 640 | 1188 |

In Table 3, NP means natural pozzolan, NZ means nanozeolite, FA means fine aggregate, and CA means coarse aggregate. All the alkali-activated cement/concrete (AAC) mixtures were prepared with a constant $Na_2SiO_3/NaOH$ weight ratio of 2.50/1. The concrete samples were de-molded after 1 day of casting, divided into two groups, and placed in plastic bags to avoid moisture evaporation. For curing, a first group of concrete samples were kept in the laboratory and maintained at 23±2° C., while a second group was cured in an oven at 60±2° C. The compressive strength of concrete was measured after 0.5, 1, 3, 7, 14, and 28 days of elevated temperature (oven) curing, while the compressive strength was measured after 3, 7, 14, 28, and 90 days for room temperature-cured (23±2° C.) samples on 50 mm cube specimens, both according to ASTM C109 [ASTM C109 2010]. Alkali-activated paste was prepared and cured at elevated temperature for 28 days after which morphology was determined using a JEOL model 5800 LV V scanning electron microscope.

UNIT WEIGHT: Table 4 shows the unit weight of concrete derived from nanozeolite (NZ) and natural pozzolan (NP), which range between 2301 and 2344 $kg/m^3$. The unit weights are comparable to the unit weight of OPC-based concrete. There was marginal increase in the unit weight of concrete samples due to the addition of nanozeolite.

TABLE 4

Unit weight of concrete.

| Mix Details | Sample # | Length, mm | Width, mm | Depth, mm | Weight, g | Unit wt., $kg/m^3$ | Avg. Unit wt., $kg/m^3$ |
|---|---|---|---|---|---|---|---|
| 0%-NZ | 1 | 50.09 | 51.25 | 51.45 | 305.25 | 2311 | 2301 |
|  | 2 | 51.23 | 50.12 | 51.14 | 298.98 | 2277 |  |
|  | 3 | 49.23 | 52.09 | 51.25 | 304.25 | 2315 |  |
| 3%-NZ | 4 | 49.09 | 52.08 | 51.31 | 307.45 | 2344 | 2322 |
|  | 5 | 51.23 | 50.45 | 51.78 | 311.2 | 2325 |  |
|  | 6 | 51.01 | 51.45 | 51.09 | 308.15 | 2298 |  |
| 5%-NZ | 7 | 51.23 | 52.07 | 50.26 | 311.78 | 2325 | 2344 |
|  | 8 | 50.23 | 51.56 | 51.07 | 311.78 | 2357 |  |
|  | 9 | 51.11 | 50.24 | 52.23 | 315.02 | 2349 |  |

Referring now to the drawings, wherein like reference numerals designate identical or corresponding parts throughout the several views.

Compressive Strength

Figure 1:
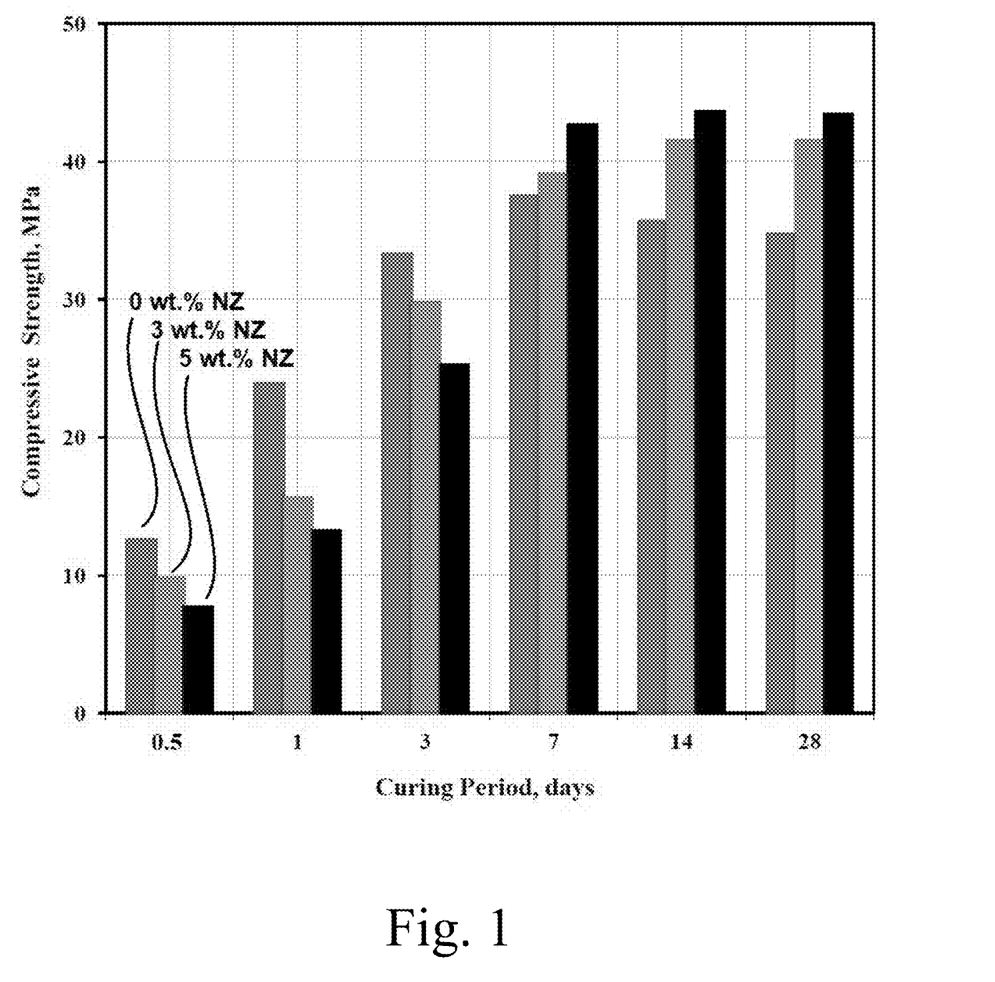
FIG. 1 shows a chart of the compressive strength development in concrete samples cured at elevated temperature.

The compressive strength development in exemplary alkali-activated concrete (AAC) mixtures cured in the oven, i.e., at 60±2° C., prepared with 0 (left), 3 (middle), and 5 (center) wt. % nanozeolite (NZ) is depicted in the chart in FIG. 1. The chart in FIG. 1 shows the development of compressive strength, measured in MPa (y-axis), over a curing period measured in days (x-axis).

Figure 2:
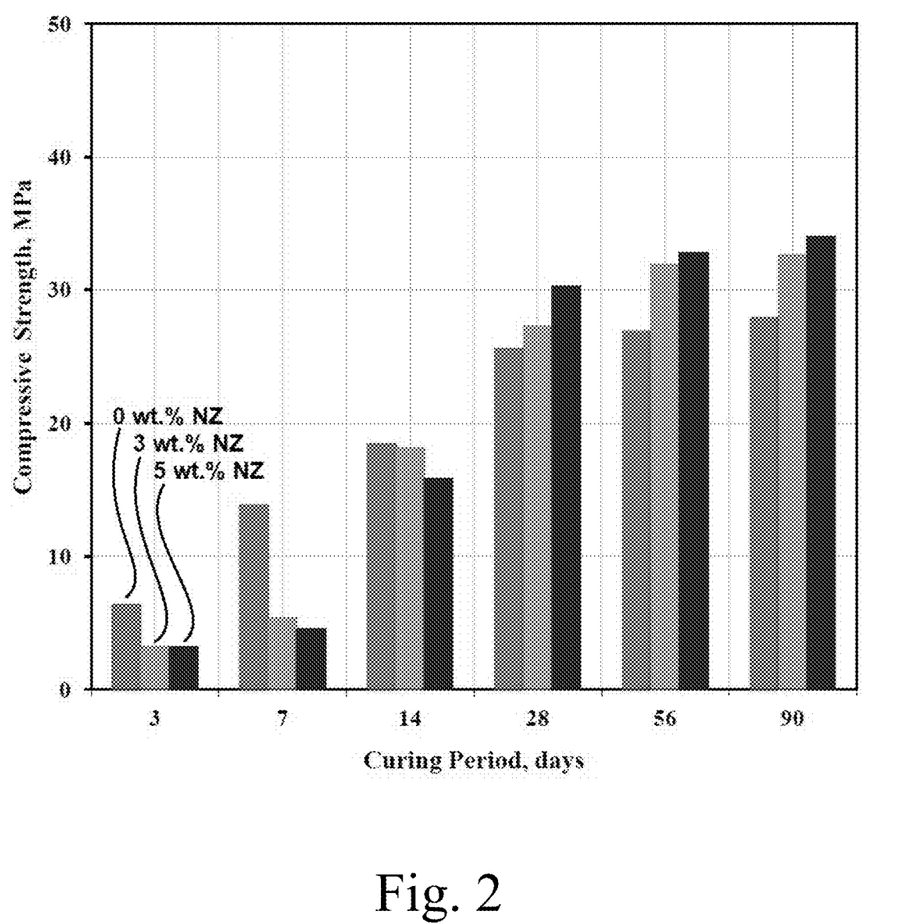
FIG. 2 shows a chart of the compressive strength development in concrete samples cured at room temperature.

FIG. 2 shows a chart of the strength development in exemplary alkali-activated concrete (AAC) mixtures cured at room temperature. The compressive strength in both the curing regimes, i.e., in FIG. 1 and FIG. 2, increased with curing time. The strength development was faster for oven-cured specimens compared to the samples cured at room temperature. Seven (7) days of heat curing was sufficient to reach a maximum strength plateau in the alkali-activated concrete (AAC) samples prepared with various nanozeolite (NZ) contents, while, the strength development continued in alkali-activated concrete (AAC) samples cured at room temperature even after 28 days.

The maximum compressive strength measured in case of oven-cured alkali-activated concrete (AAC) samples was 37.52 MPa for exemplary mixtures containing 0 wt. % nanozeolite (NZ), 41.54 MPa for exemplary mixtures containing 3 wt. % nanozeolite (NZ), and 43.62 MPa for exemplary mixtures containing 5 wt. % nanozeolite (NZ). The maximum compressive strength measured in case of alkali-activated concrete (AAC) samples cured at room temperature was 27.93 MPa for exemplary mixtures containing 0 wt. % nanozeolite (NZ), 32.56 MPa for exemplary mixtures containing 3 wt. % nanozeolite (NZ), and 33.97 MPa for exemplary mixtures containing 5 wt. % nanozeolite (NZ).

Based on these results, the compressive strength gain in the concrete mixtures including 3 or 5 wt. % nanozeolite (NZ) additive, cured at elevated temperature, was respectively 10 or 16% over control samples, i.e., without nanozeolite (NZ). However, for samples cured at room temperature, the gain in compressive strength was 16% for concrete mixtures including 3 wt. % nanozeolite (NZ) additive and 21% for concrete mixtures including 3 or 5 wt. % nanozeolite (NZ) additive. The maximum compressive strength was gained for concrete samples cured at room conditions was at 90 days.

The improvement in the performance of alkali-activated concrete (AAC) samples containing nanozeolite (NZ), in terms of compressive strength, particularly with 5 wt. % nanozeolite (NZ), may be attributable to the enhanced transformation of source materials to the polymeric gel in the presence of highly reactive nanozeolite (NZ) as well as due to the possible particle packing effect of nanoparticles in the binder structure.

Morphology

Figure 3:
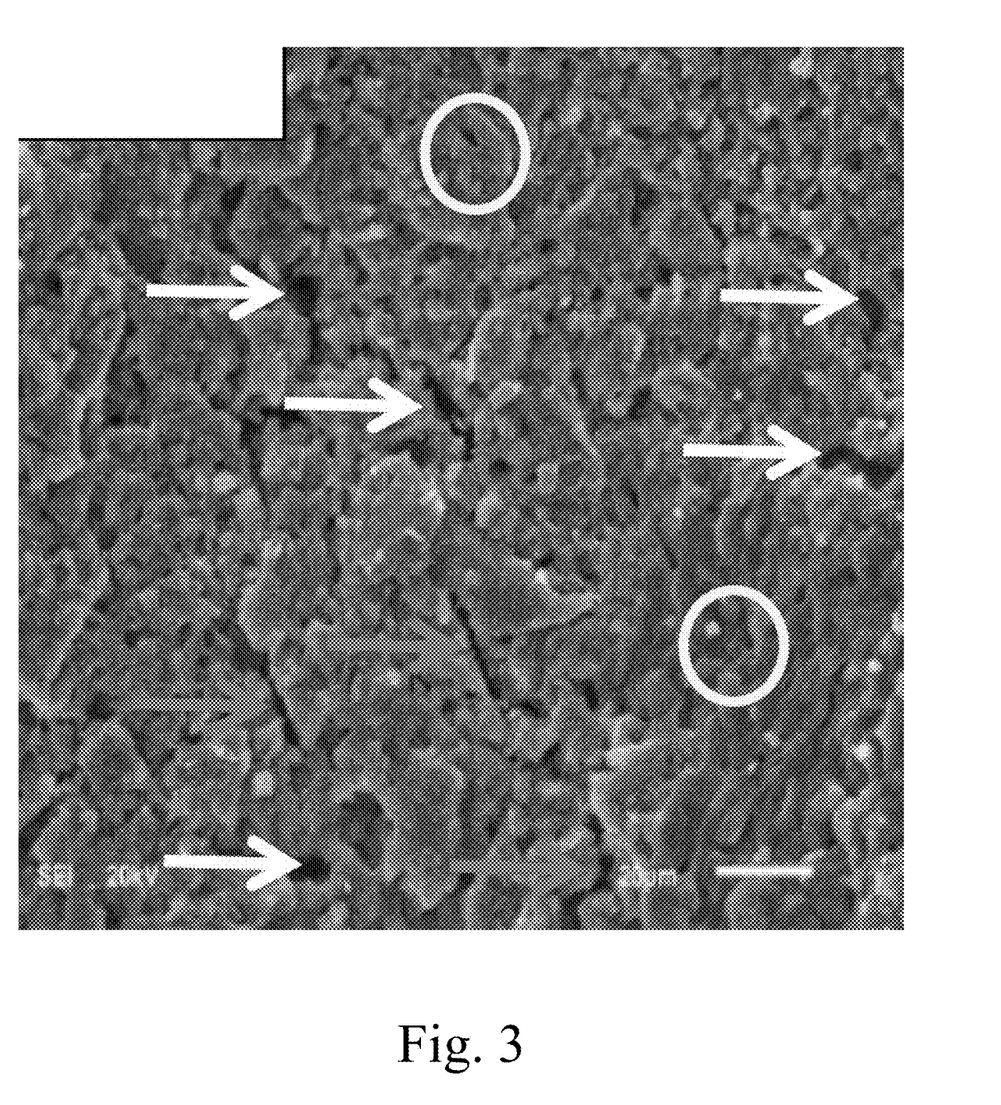
FIG. 3 shows a scanning electron microscope (SEM) image of an exemplary alkali-activated natural pozzolan paste, modified with 0 wt. % nanozeolite (NZ), wherein the white arrows represent voids, the red arrows represent wide cracks, the yellow arrows represent fine cracks, and the yellow circles represent uniform gel.
Figure 4:
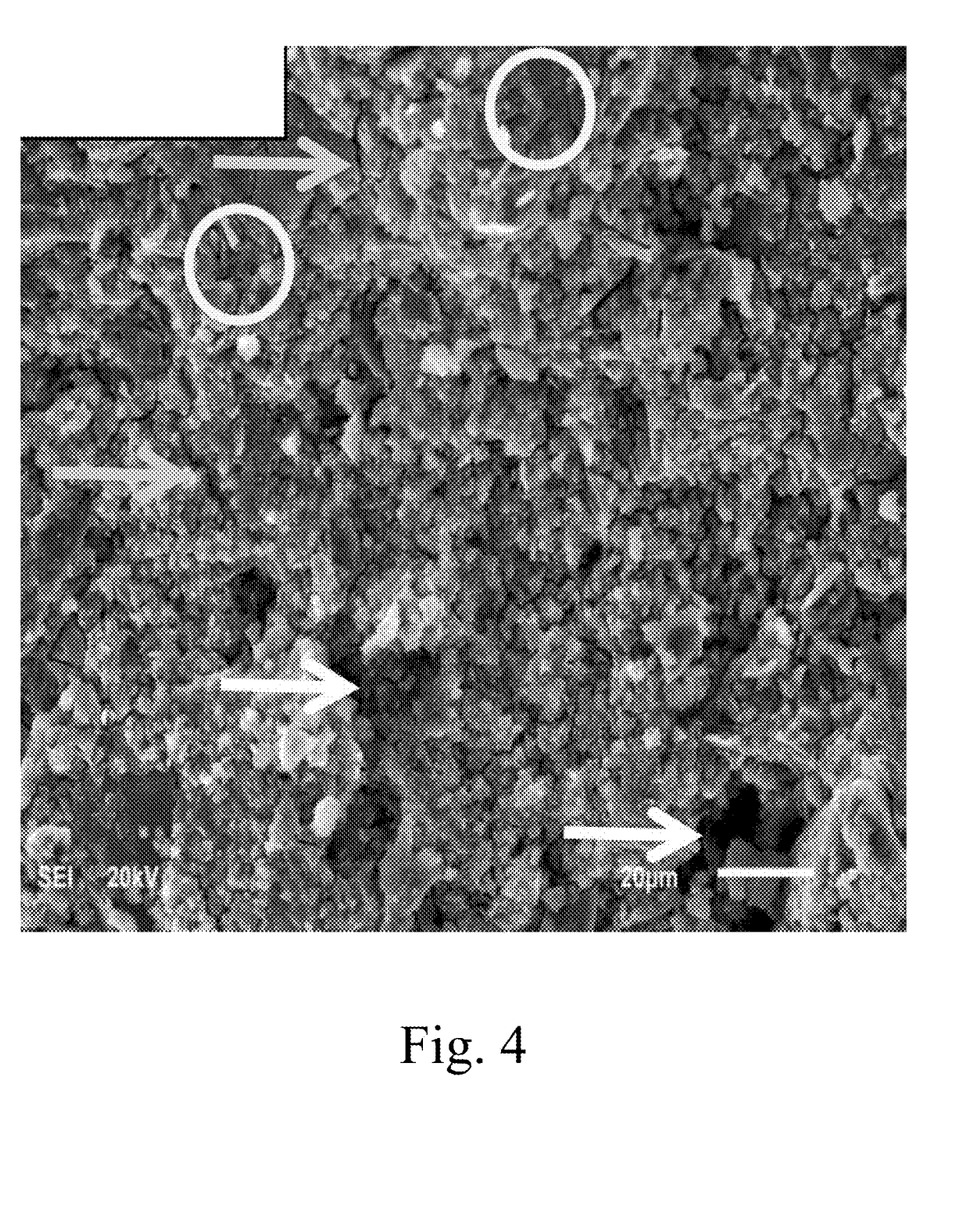
FIG. 4 shows a scanning electron microscope (SEM) image of an exemplary alkali-activated natural pozzolan paste, modified with 3 wt. % nanozeolite (NZ), wherein the white arrows represent voids, the red arrows represent wide cracks, the yellow arrows represent fine cracks, and the yellow circles represent uniform gel.
Figure 5:
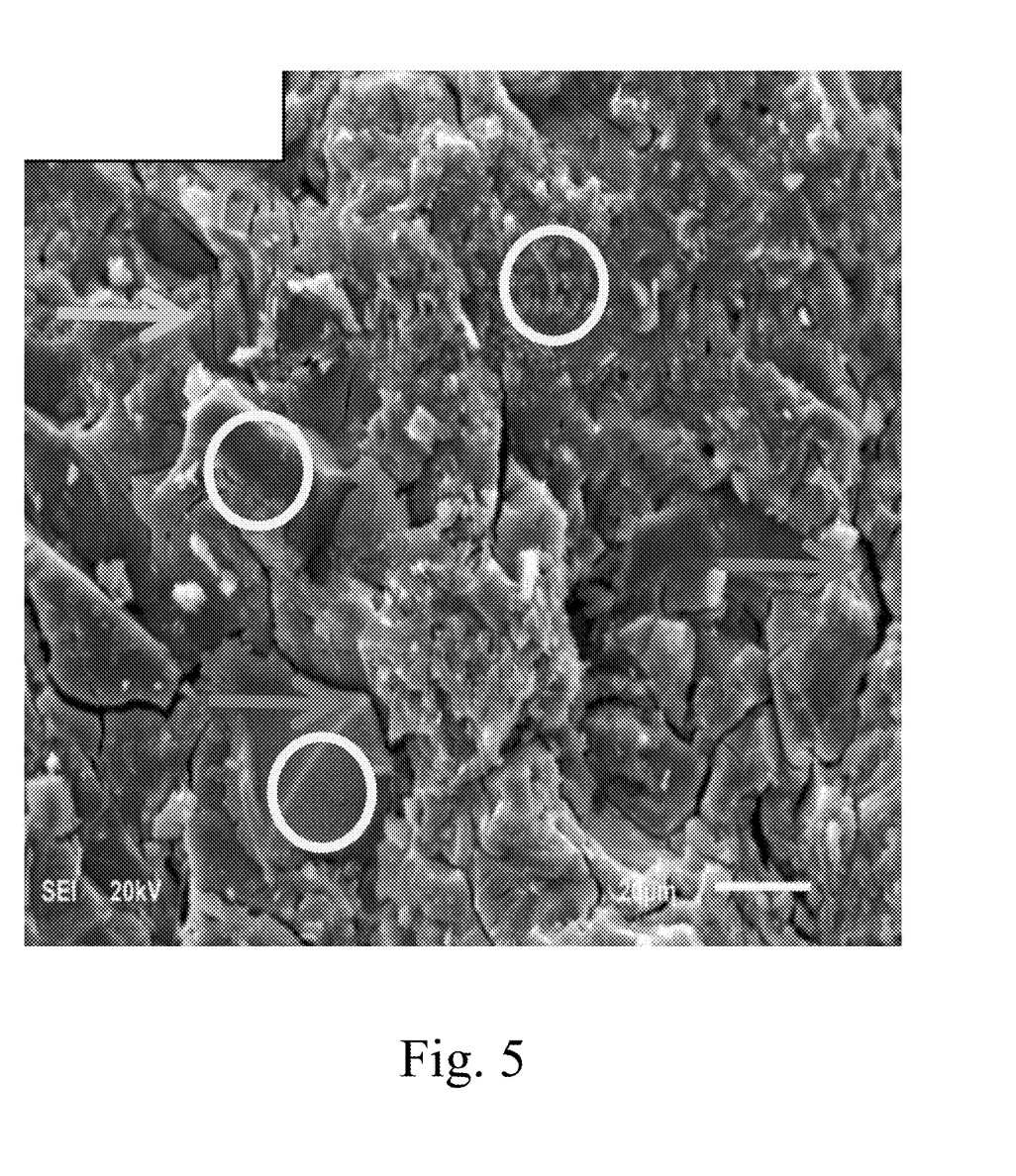
FIG. 5 shows a scanning electron microscope (SEM) image of an exemplary alkali-activated natural pozzolan paste, modified with 5 wt. % nanozeolite (NZ), wherein the white arrows represent voids, the red arrows represent wide cracks, the yellow arrows represent fine cracks, and the yellow circles represent uniform gel.

FIGS. 3 to 5 present the scanning electron microscope (SEM) images of geopolymer (i.e., cement/concrete) pastes incorporating nanozeolite (NZ) cured at elevated temperature for seven (7) days. The SEM analysis of the morphology of alkali-activated paste was not carried out for the specimens cured at room temperature. The microstructure of the specimen prepared without nanozeolite (NZ) showed considerable porosity under the SEM with widespread cracking/faults. When nanozeolite (NZ) was added to the concrete mixtures, i.e., FIG. 4 and FIG. 5, the microstructures appear to begin to increase in density with a reduction in cracks and voids.

In the exemplary mixtures prepared by incorporating 3 wt. % and 5 wt. % nanozeolite (NZ), the SEM micrographs showed denser microstructure, with homogenous gel-like matrices. The microstructure of exemplary alkali-activated paste (AAP), e.g., not containing aggregate, modified with 3 wt. % and 5 wt. % nanozeolite (NZ) were similar, while the mixture containing no zeolite (FIG. 3) lacked the white spheroid features and surface texturing seen in FIGS. 4 and 5 (FIG. 3 shows 0% nanozeolite, FIG. 4 shows 3% nanozeolite, and FIG. 5 shows 5% nanozeolite). The more homogenous gel in case of alkali-activated paste (AAP) modified with 3 wt. % and 5 wt. % nanozeolite (NZ) with undefined boundaries may be due to the presence of polymeric compounds in the nanozeolite-containing mixtures.

In FIGS. 3 to 5, the white arrows represent voids, the red arrows represent wide cracks, the yellow arrows represent fine cracks, and the yellow circles represent uniform gel. In the materials having 3 or 5 wt. % of the pozzolan replaced by zeolite, a higher frequency of fine cracks (e.g., under 1, 0.9, 0.8, 0.75, 0.7, 0.6, 0.5, 0.4, 0.3, 0.2, or 0.1 μm and in a range of from 10 to roughly 30 μm long) is observed than wide cracks (e.g., at least 1, 1.5, 2, 2.5, 3, or 3.5 μm wide and from 20, 30, 40, 50, or 50 μm long, up to 100, 80, or 60 μm long). The zeolite-comprising materials can have a spheroid-coated rough appearance (FIG. 4), with spheroid morphologies having average diameters of, e.g., at least 1, 1.5, 2, 2.5, 3, 4, or 5 μm and/or up to 7.5, 7, 6.5, 6, 5.5, 5, 4.5, 4, 3.5, 3, or 2.5 μm, contiguously coated along the outer surface in a mono or bilayer arrangement. FIG. 4 shows a lichen-like surface topological appearance, with roughly 10, 7.5, or 5% of the surface area being taken up by spheroid cavities having average diameters of, e.g., at least 10, 12.5, or 15 μm and/or up to 30, 25, 20, or 15 μm. Replacing further pozzolan with zeolite, as seen in FIG. 5, can yield less rough, less spheroid-coated surface topology, with instead more smooth, contiguous outer surfaces interrupted by fine and wide cracks. Roughly 10, 15, or 20% of the outer surface of FIG. 5 may include rough-textured topology, but having irregular outcroppings and projections, including roughly 25±2.5, 5, 7.5, or 10% rectangular prismic protrusions, rather than spheroid coating. FIG. 3, without zeolite replacement of pozzolan, shows a smoothed, cracked surface, without notable protrusions, spheroid or prismic, and more like shoulders of substantially smooth layers.

Based on the several micrographs observed while taking the SEM images, the partial filling of voids observed in FIGS. 4 and 5 for the specimens prepared with 3 wt. % and 5 wt. % nanozeolite (NZ) which may have resulted in the higher compressive strengths observed. In specimens prepared without nanozeolite (NZ), the micrographs indicted less solid area in the structure, which may explain the lower compression strength of the exemplary nanozeolite-free concrete. These outcomes are consistent with the compressive strength results, wherein 3 wt. % and 5 wt. % replacement of natural pozzolan with nanozeolite (NZ) can lead to superior strength.

The initial sluggishness in the development of strength in the exemplary concrete mixes containing higher nanozeolite (NZ) may have been due to the increase in the silica content for a given amount of alkaline solution. This increased silica content may have contributed to delayed polymerization, particularly in the specimens cured at room temperature. However, there considerable compression strength gain was observed in the exemplary nanozeolite-containing mixtures when cured at elevated temperature. Nonetheless, as the curing continued, the availability of additional soluble silica may have accelerated the polymerization process, which may explain the enhanced transformation of source materials into polymeric gel in nanozeolite-containing mixtures. These results indicate that the polymerization process may be influenced by the availability of soluble silica, particularly in the mixtures incorporating microsilica, resulting in the formation of calcium silicate hydrate (C—S—H) or calcium alumina silicate hydrate (C-A-S—H) gels along with the sodium alumina silicate hydrate (N-A-S—H) products.

Calcium silicate hydrate (C—S—H) is the main product of the hydration of Portland cement, as well as alkali-activated binders, and plays a role in developing the strength in cement-based materials. Variable stoichiometry calcium silicate hydrate (C—S—H), calcium alumina silicate hydrate (C-A-S—H), and sodium alumina silicate hydrate (N-A-S—H) pastes are analogously related to the general calcium silicate hydrate (C—S—H) reaction between the silicate phases of Portland cement and water, theoretically expressed as Equation 1, below:

$$2Ca_3SiO_5 + 7H_2O \rightarrow 3CaO.2SiO_2.4H_2O + 3Ca(OH)_2 + 173.6 \text{ kJ} \qquad \text{Eq. 1.}$$

Synthetic C—S—H can be prepared from CaO and $SiO_2$ in water or through the double precipitation method using various salts, at specific C/S ratios. C—S—H from cement phases can also be treated with ammonium nitrate to achieve a desired C/S ratio.

The results therefore indicate that the inventive green cements described and exemplified herein can perform the function of ordinary Portland (or other hydraulic) cements, while using pozzolan and zeolite nanoparticles, rather than hydraulic cement.

Numerous modifications and variations of the present invention are possible in light of the above teachings. It is therefore to be understood that within the scope of the appended claims, the invention may be practiced otherwise than as specifically described herein.

The invention claimed is:

1. A dry concrete composition, comprising:
   10 to 30 wt. % of natural pozzolan;
   0.25 to 10 wt. % of a zeolite particles having an average longest dimension of 25 to 45 nm;
   20 to 50 wt. % of a fine aggregate having an average longest dimension of less than 9.55 mm;
   35 to 60 wt. % of a coarse aggregate having an average longest dimension of 9.55 to 100 mm; and
   2.5 to 12.5 wt. % of an alkali activator comprising sodium hydroxide (NaOH) and sodium silicate ($Na_2SiO_3$),
   wherein the amounts of the natural pozzolan, the zeolite particles, the fine aggregate, the coarse aggregate and the alkali activator are 100 wt. % of the dry concrete composition,
   wherein the composition comprises no more than 15 wt. % hydraulic cement, and
   wherein the composition is suitable, when set, to provide a concrete of a compressive strength of at least 14 MPa, as determined by ASTM C109.

2. The composition of claim 1, wherein the zeolite particles have a specific surface area in a range of from 50 to 120 $m^2/g$.

3. The composition of claim 1, wherein the zeolite particles have a bulk density of 1.2 to 1.8 $g/cm^3$.

4. The composition of claim 1, wherein the zeolite particles have a pH in a range of from 8 to 11, when suspended in water.

5. The composition of claim 1, wherein a weight ratio of the natural pozzolan to the zeolite nanoparticles is in a range of from 15:1 to 35:1.

6. The composition of claim 1, wherein a weight ratio of the coarse aggregate to the fine aggregate is in a range of 1.5:1 to 2.3:1.

7. The composition of claim 1, wherein a weight ratio of a total weight of the fine and coarse aggregates to a total weight of the natural pozzolan and the zeolite nanoparticles is in a range of 4:1 to 5:1.

8. The composition of claim 1, wherein a weight ratio of the alkali activator to the natural pozzolan is in a range of 0.5:1 to 0.6:1.

9. The composition of claim 1, wherein a weight ratio of the sodium silicate to the sodium hydroxide is in a range of 1.5:1 to 4:1.

10. The composition of claim 1, wherein the natural pozzolan comprises, relative to a total weight of the natural pozzolan:
    35 to 45 wt. % of $SiO_2$;
    8 to 16 wt. % of $Al_2O_3$;
    12 to 25 wt. % of $Fe_2O_3$;
    6 to 15 wt. % of CaO;
    5 to 12 wt. % of MgO;
    1 to 3 wt. % of $K_2O$;
    2 to 7 wt. % of $Na_2O$; and/or
    0.3 to 1.5 wt. % of $TiO_2$.

11. The composition of claim 1, comprising no more than 1 wt. % hydraulic cement.

12. The composition of claim 1, which is sufficient to provide a solid having a compressive strength in a range of from 30 MPa to 70 MPa, when set, as determined by ASTM C109.

13. The composition of claim 1, wherein the fine aggregate comprises at least 75 wt. % dune sand, relative to total fine aggregate weight.

14. The composition of claim 1, wherein the coarse aggregate comprises at least 75 wt. % of crushed limestone, relative to total coarse aggregate weight.

15. A wet concrete slurry, comprising:
the composition of claim 1; and
no more than 5 wt. % water,
wherein the slurry is sufficiently fluid to pour under gravity in ambient conditions.

16. A pozzolan concrete, comprising a cured form of the slurry of claim 3.

17. The concrete of claim 16, which has a compressive strength of 20 to 50 MPa after curing at a temperature of 21 to 25° C. for 28 days, and a compressive strength of 30 to 75 MPa after curing at a temperature of 50 to 70° C. for 7 days, as determined by ASTM C109.

18. The concrete of claim 16, cured at a temperature in a range of from 15 to 40° C.

19. The concrete of claim 16, cured at a temperature above 40° C.

20. A building, comprising the concrete of claim 16 as a structural element.

* * * * *